Feb. 7, 1939.  C. A. SISLER  2,146,235

TRACTION WHEEL FOR TRACTORS

Filed May 15, 1937  3 Sheets-Sheet 1

Inventor

C. A. Sisler

By Clarence A. O'Brien
Hyman Berman
Attorneys

Feb. 7, 1939.  C. A. SISLER  2,146,235
TRACTION WHEEL FOR TRACTORS
Filed May 15, 1937   3 Sheets-Sheet 2

Inventor
C. A. Sisler
By Clarence A. O'Brien
Hyman Berman
Attorneys

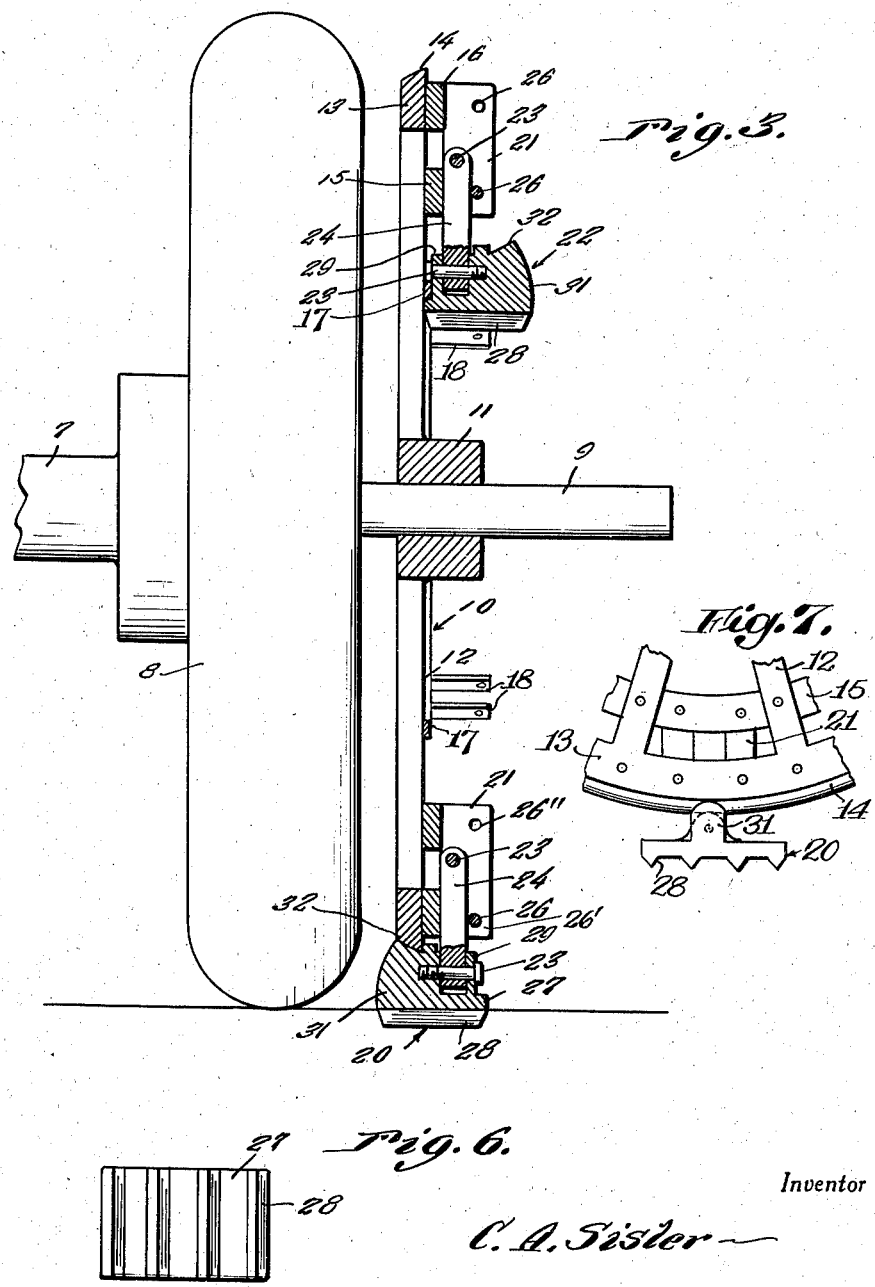

Patented Feb. 7, 1939

2,146,235

UNITED STATES PATENT OFFICE 2,146,235

TRACTION WHEEL FOR TRACTORS

Charles A. Sisler, Stanwood, Iowa

Application May 15, 1937, Serial No. 142,907

5 Claims. (Cl. 301—50)

This invention relates to what may be called a permanently attached auxiliary traction wheel for use in association with present day pneumatic tire-equipped farm tractors, and the purpose of the invention is to provide an accessory of this type which is at all times associated with the tire and which is of a projectable and retractable character, whereby to permit the same to be brought into play when the tire fails to give the desired traction, as occurs in muddy and ice covered fields.

In reducing to practice the principles of the present invention, I propose the provision of a light weight yet sturdy structure characterized by an auxiliary spoke-equipped wheel having on its rim pivotally mounted projectable and retractable anti-skid members constructed to perform the function of traveling feet or shoes sufficient in kind to afford reliable traction facilities.

Other objects, features and advantages of the invention will become more readily apparent from the following description and drawings.

In the accompanying drawings, wherein like numerals are employed to designate like parts throughout the views:

Figure 3 is a central vertical sectional view taken approximately on the plane of the line 3—3 of Figure 1 this view showing the upper lug in its retracted position.

Figure 6 is a face view showing the anti-slipping lugs or teeth, provided on each traction shoe.

Figure 7 is a fragmentary view of the inside of the periphery of the rim with parts in section.

Figure 1:
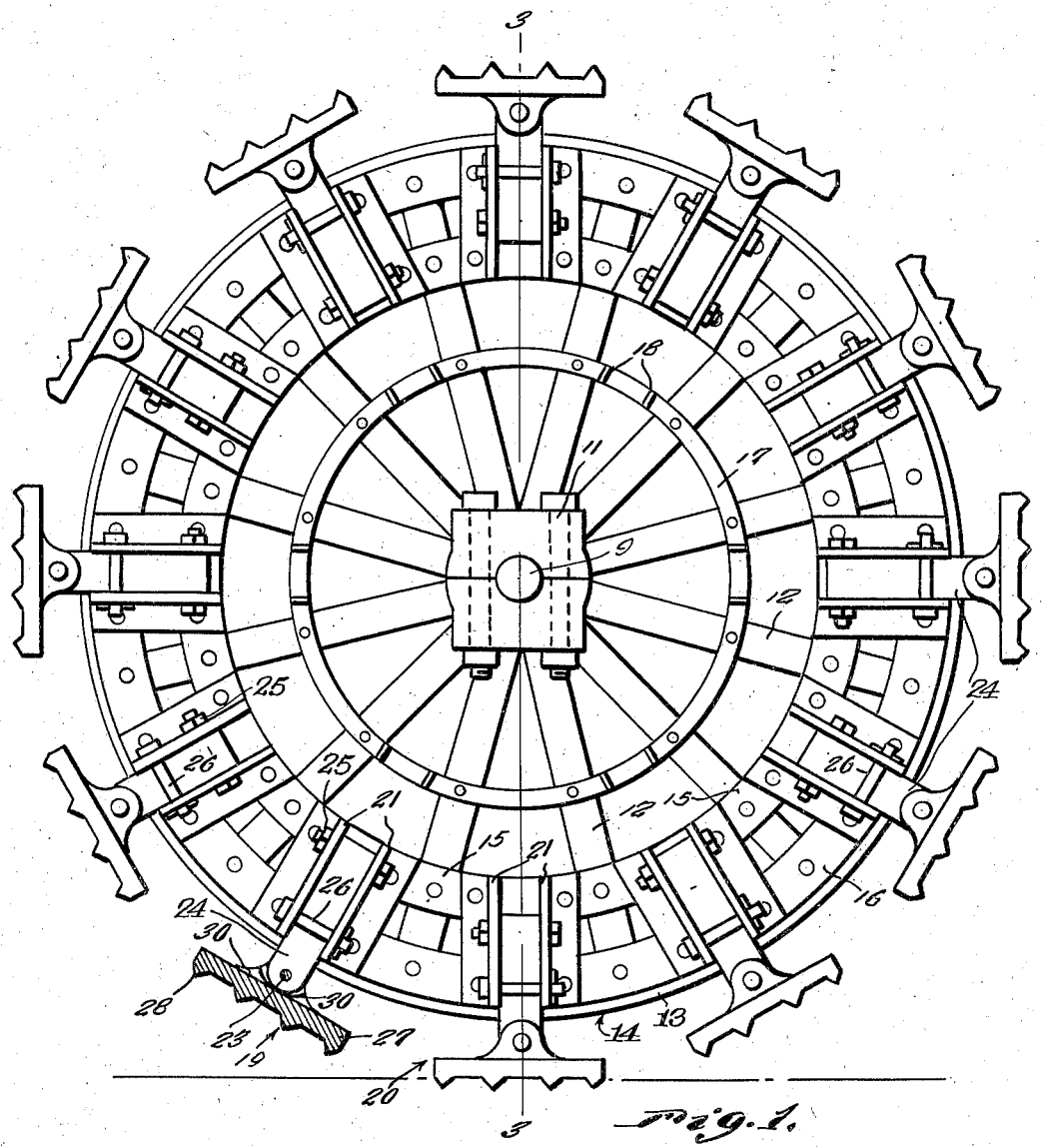
Figure 1 is a side elevational view of the complete assemblage showing the traction shoes and their attaching members projected to positions for use.

Referring now to the drawings by distinguishing reference numerals and referring first to Figure 3, it will be observed that the main tractor axle is denoted by the numeral 7, and the pneumatic tire-equipped wheel is indicated at 8. The numeral 9 indicates an auxiliary stub axle to accommodate the auxiliary traction wheel.

Figure 2:
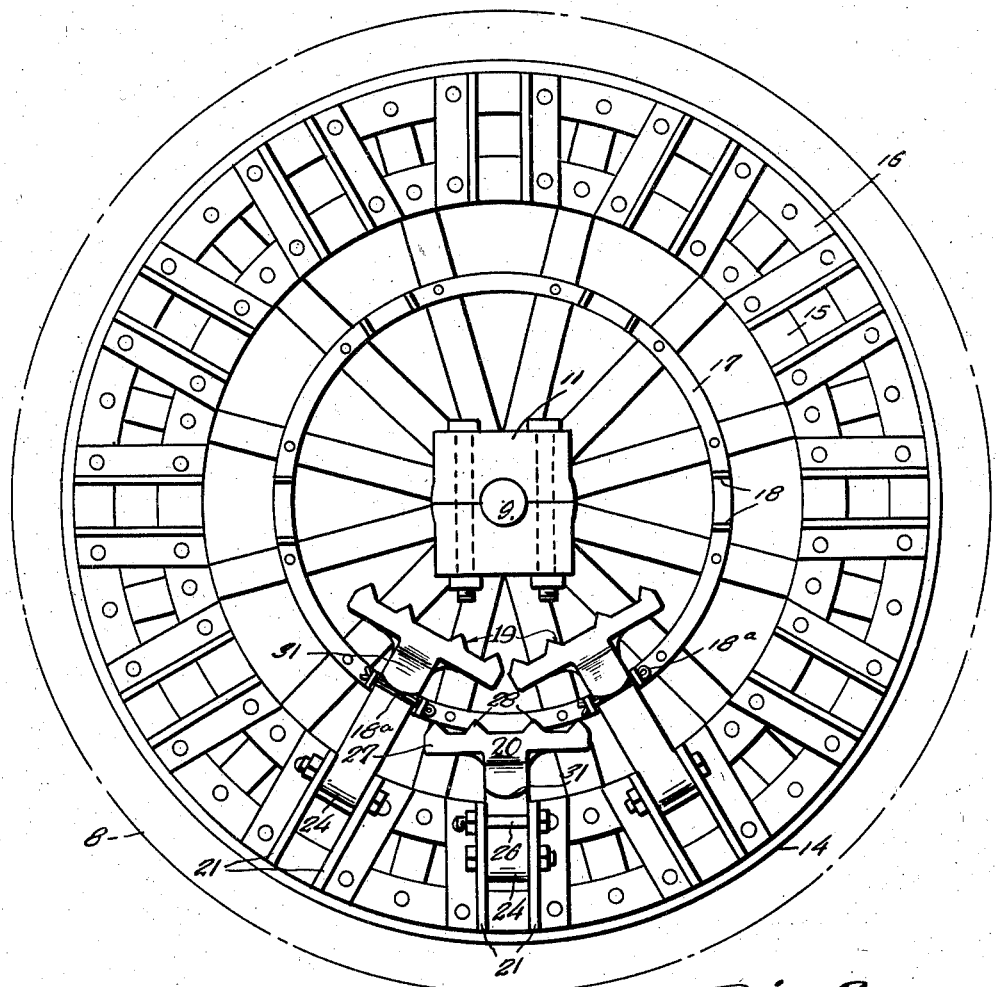
Figure 2 is a similar view with sufficient of the features shown to illustrate the principle of folding or collapsing and disposing the traction shoes in a retracted out-of-the-way position.
Figure 5:
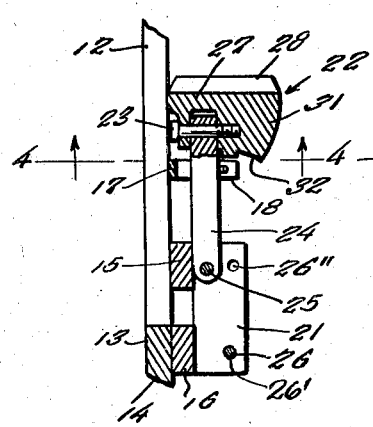
Figure 5 is a fragmentary detail sectional and elevational view showing one of the traction units in its retracted or folded state.

The auxiliary traction wheel comprises a main frame unit 10 which includes an appropriate sectional hub 11 designed to be clamped on the stub axle. It further includes radial spokes 12 and a marginal rim 13, the outer periphery of which is beveled as at 14 to serve a purpose to be hereinafter described. Suitably riveted or otherwise secured to the outer faces of the spokes and disposed concentrically within the limits of the rim are inner and outer annular adapter bands or rings 15 and 16. Also attached to the spokes inwardly of the innermost ring 15 is a third ring 17 which may be differentiated as a keeper ring. As seen in Figures 1 and 3, this keeper ring is provided with pairs of circumferentially spaced outstanding lugs 18 adapted to accommodate the arms of certain ones of the traction shoe units. The lugs, as shown to advantage in Figure 2, are adapted to accommodate cotter keys or pins 18a which act to hold said arms between the lugs.

The traction shoe units are substantially identical in basic construction. Nevertheless, it is desirable to point out that they are disposed in alternating series. Thus, the comparatively long or larger units are denoted by the numerals 19, while the intervening shorter units are indicated by the numerals 20. The longer units 19 swing in against the keeper ring 17 where they are held in an out-of-the-way position by the aforementioned cotter keys 18a. This makes it possible to swing the shorter units 20 into positions between the longer ones to provide the desired nesting group assembly when all traction units are retracted or swung in to an out-of-the-way position, as seen in Figure 2. Otherwise, the units would clash and interfere with expeditious collapsing.

Inasmuch as each traction shoe unit and its attaching means is of identical construction, a description of one will suffice for all. Proceeding with this thought in mind, it will be seen that each assembly comprises a pair of spaced parallel angle iron brackets 21. The brackets are disposed in radial order and attached to the inner and outer rings 15 and 16. The traction shoe 22 is pivotally mounted as at 23 on the outer end of an associated arm 24, the arm being pivoted as at 25 between the flanges of the bracket 21. As will be seen the arms of the units 19 are longer than the arms of the units 20 and the pivot 25 of each of the long arms is placed nearer the inner ends of the brackets 21 than are the pivots of the shorter arms of the units 20. All the arms are held in the outward or operative position by the bolts or pins 26 passing through holes 26' adjacent the outer ends of the brackets 21 and the short arms of the units 20 are held in inoperative position, when swung inwardly to the position shown in Figure 2 by these same bolts or pins 26 which are then placed in other holes 26'' which are located adjacent the inner ends of the brackets, as shown at the bottom of Figure 2 and the top of Figure 3. The long arms of the units 19 are held in inoperative position or when swung inwardly between the lugs 18 of the ring 17 by the pins 18a as shown in Figure 2.

Each shoe comprises a substantially rectangular block-like body 27 whose outer surface is provided with anti-slipping teeth 28. On the inner side are integral parallel ears 29 which serve to accommodate the aforementioned pivot pin 23. Between the ears 29 are stop elements 30 which coordinate with the ears and pins to limit the swinging movement of the shoes with respect to the adjacent ends of the attaching arms 24. This self accommodating tilt of the shoes is desirable to promote effective and compensating contact with the surface as each shoe swings around through its orbital path to engage the ground. Thus, in a sense, we have rocking shoes on the outer ends of the attaching arms 24.

Figure 4:
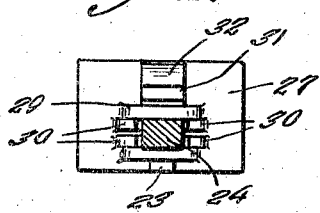
Figure 4 is a detail section through one of the traction shoe units taken approximately on the line 4—4 of Figure 5.

Each shoe is further provided with a thickened portion 31. As shown in Figure 4, this feature 31 is located intermediate the opposite transverse ends of the shoe. Said feature 31 may be best described as a stabilizing and retention abutment. It is provided with an adapter notch properly shaped and beveled to conform to the beveled periphery 14 of the wheel rim. Consequently, when the shoe is swung out to its operative position, the shoulder forming adapter notch 32 seats itself against the beveled periphery of the rim as disclosed to advantage at the bottom of Figure 3. As will be seen from Figure 2 the shoulder formed by this notch 32 is of arcuate shape so that only the radially inner portion of said shoulder will engage the edge 14 of the ring 13 when the shoe is in operative position and thus the shoe can have limited rocking movement on the pivot 23 though this shoulder formed by the notch 32 will bear sufficiently upon the periphery 14 as it takes the strain from the pin 23 and the pin 25.

It is evident that by properly stabilizing the shoe in this manner, stress and strain is equalized and the main thrust is brought to bear against the rim rather than against the pivots 23 and 25, respectively.

It is advantageous in a structure of this type to provide the permanently attached traction means characterized by the rim-type wheel having the marginally arranged circumferentially spaced projectable and retractable traction shoes. More specifically, however, an apparent feature of distinction resides in the coordination of the shoes in set or alternating groups whereby to permit them to be closely arranged to afford effective traction and to at the same time fold inwardly to an out-of-the-way compact and convenient order. The triple ring arrangement serving to accommodate the radial brackets and associated features is believed to be ingenious. More specifically, however, the novelty apparently resides in the pairs of angular brackets 21 to accommodate the pivoted self adapting swingably mounted traction shoes 22. All features have been carefully selected and systematically organized to promote efficiency in operation, whereby to promote effective traction when such extra traction is needed in the field.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A traction device of the class described comprising a wheel, spaced pairs of brackets connected to one face of the wheel and extending radially and having their outer ends spaced from the rim of the wheel, the brackets of each pair being spaced apart, a ring attached to said face of the wheel and spaced inwardly from the inner ends of the brackets, a plurality of pairs of axially outwardly extending lugs on said ring, the lugs of each pair being spaced apart, said lugs having perforations therein, arms each having one end pivoted between a pair of brackets, said arms projecting beyond the rim when swung outwardly and said arms fitting between a pair of lugs when swung inwardly, a pin passing through the perforations of the lugs for holding the arms between said lugs, a traction shoe connected with the free end of each arm, said brackets having perforations therein and a pin passing through the perforations of each pair of brackets for holding the arms between the brackets after the arm has been swung outwardly.

2. A traction device of the class described comprising a wheel, a plurality of spaced pairs of radially extending brackets connected to one face of the wheel, the brackets of each pair being spaced apart, a ring connected to said face of the wheel and spaced inwardly from the inner ends of the brackets, a plurality of pairs of axially outwardly extending lugs on the ring, the lugs of each pair being spaced apart and said lugs being arranged in substantially radial alignment with the brackets of every other pair, long arms pivoted between the pairs of brackets of said every other pair and adjacent the inner ends of the brackets, said arms projecting from the rim when the arms are swung outwardly and fitting between the lugs when the arms are swung inwardly, pins passing through the lugs for holding the arms in their inward position, short arms pivoted between the brackets of the other pairs, the pivots of the short arms being located farther from the inner ends of the brackets than are the pivots of the long arms, shoes connected with the outer ends of all the arms, pins passing through the brackets for holding all the arms in their outward positions and the brackets for the short arms having holes adjacent their inner ends for receiving some of said pins for holding the short arms in their inward positions.

3. In a traction device, a wheel including a rim, an arm pivoted to one face of the wheel at a point spaced inwardly from the periphery of the rim, said arm extending beyond the rim when swung outwardly, a shoe pivoted to the free end of said arm, said shoe having a notch in its axially inner face for receiving a portion of the periphery of the rim when the arm is swung outwardly, said notch forming a shoulder of arcuate shape, a radially inner portion of which engages the periphery of the rim when the arm is swung outwardly, means for holding the arm in its outer position and means for holding the arm in its inner position.

4. In a traction device, a wheel including a rim, an arm pivoted to one face of the wheel at a point spaced inwardly from the periphery of the rim, said arm extending beyond the rim when swung outwardly, a shoe pivoted to the free end of said arm, said shoe having a notch in its axially inner face for receiving a portion of the periphery of the rim when the arm is swung outwardly, said notch forming a shoulder of arcuate shape, a radially inner portion of which engages the periphery of the rim when the arm is swung outwardly, means for holding the arm in its outer position and means for holding the arm in its inner position, the periphery of the rim being beveled from one face of the wheel to the opposite face thereof and the shoulder formed by the notch having a corresponding bevel.

5. In a traction device, a wheel including a rim, an arm pivoted to one face of the wheel at a point spaced inwardly from the periphery of the rim, said arm extending beyond the rim when swung outwardly, a shoe pivoted to the free end of said arm, said shoe having a notch in its axially inner face for receiving a portion of the periphery of the rim when the arm is swung outwardly, said notch forming a shoulder of arcuate shape, a radially inner portion of which engages the periphery of the rim when the arm is swung outwardly, means for holding the arm in its outer position and means for holding the arm in its inner position, and means on the inner face of the shoe for engaging parts of the arm for limiting rocking movement of the shoe on the arm.

CHARLES A. SISLER.